UNITED STATES PATENT OFFICE.

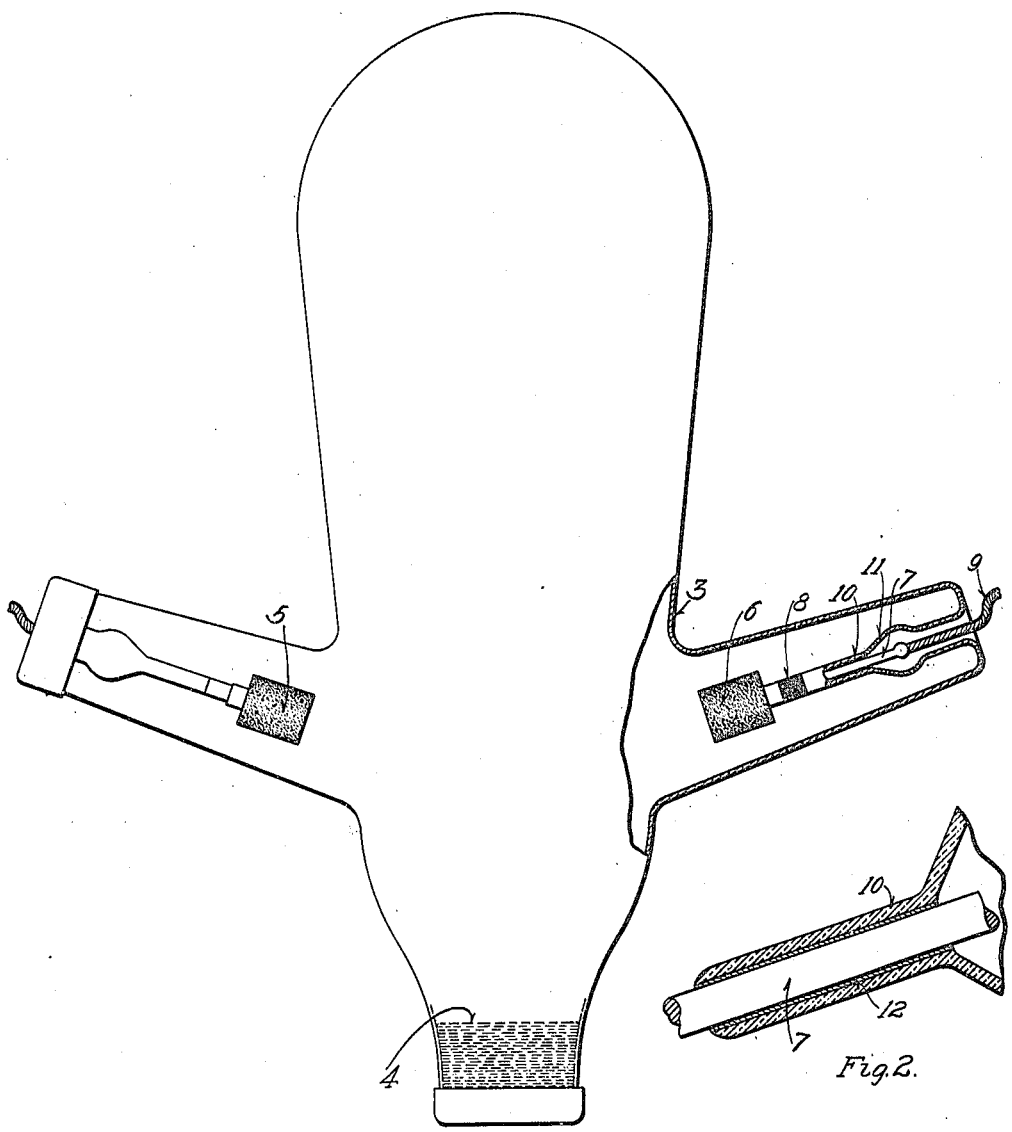

HAROLD A. NEWCOMB, OF WILKINSBURG, PENNSYLVANIA, ASSIGNOR TO WESTINGHOUSE ELECTRIC AND MANUFACTURING COMPANY, A CORPORATION OF PENNSYLVANIA.

SEAL.

1,266,614.     Specification of Letters Patent.     Patented May 21, 1918.

Application filed January 6, 1915. Serial No. 811.

*To all whom it may concern:*

Be it known that I, HAROLD A. NEWCOMB, a citizen of the United States, and a resident of Wilkinsburg, in the county of Allegheny and State of Pennsylvania, have invented a new and useful Improvement in Seals, of which the following is a specification.

My invention relates to gas-tight seals between glass and metal and more particularly to seals between the walls of glass containers adapted to be evacuated and electrical leading-in wires projecting therethrough.

The object of my invention is to provide a seal of the character specified which will be simple and inexpensive in manufacture and which will remain gas tight throughout long periods of time and throughout comparatively large temperature ranges.

Referring to the accompanying drawings, Figure 1 is a side view, partially in section and partially in elevation, of a mercury-vapor rectifier embodying my invention; and Fig. 2 is an enlarged side view, partially in section and partially in elevation, of the seal employed in the rectifier of Fig. 1.

For many years it has been customary to introduce current into evacuated glass containers, such, for example, as incandescent lamps, by means of platinum leading-in wires. It is a comparatively easy matter to provide seals of this type in small capacities which will remain absolutely gas tight over long periods of time because of the fact that there are many glasses the coefficient of expansion of which is substantially identical with that of platinum. When, however, it is desired to manufacture seals of relatively large carrying capacity such, for example, as are necessary for mercury-vapor rectifiers, the amount of platinum necessary to provide the desired current-carrying capacity is quite large and, at the present price of platinum, increases the total cost of the rectifier bulb to an undesirable degree. Furthermore, the glasses which make effective seals with platinum have a relatively low melting point and are therefore ill adapted to withstand the high temperatures met with in the rectifier art.

In the search for a metal which would be a suitable substitute for platinum, the following qualities are necessary: (1) the metal should have a comparatively high melting point; (2) it should have a low coefficient of expansion; (3) it should have high specific conductivity (4) it should either be free from surface oxids or have surface oxids which may be readily dissolved by suitable fluxes and (5) it should not amalgamate with mercury. The metals tungsten and molybdenum, preferably in the drawn state, are found to satisfy all of these conditions, and I have manufactured satisfactory seals from each of these metals, although I find tungsten better for general use because more highly resistant to amalgamation. The coefficient of expansion of tungsten and molybdenum is in the neighborhood of $3.5 \times 10^{-6}$ or substantially one-third that of platinum and, furthermore, these metals have a current-carrying capacity substantially three times that of platinum.

I have found that sodium boro-silicate glasses may be so compounded as to exhibit a coefficient of expansion substantially equal to that of tungsten; they are comparatively refractory; and, furthermore, when in the fused state, they "wet" tungsten. Hence by the use of a suitable flux such, for example, as potassium nitrite or a mixture of potassium nitrite and borax; or by the use of other means to prevent harmful oxidation; I am enabled to provide a satisfactory seal.

Referring to the accompanying drawing, 3 is the container of a mercury-vapor rectifier of an ordinary type provided with a liquid cathode 4 and with two anodes 5 and 6. The anode 6, formed of any suitable material, such for example, as iron, carbon or tungsten, is mounted upon a stem 7 of tungsten or molybdenum. A bead 8 of refractory, heat insulating material, such, for example, as lava may be placed upon the stem 7 to protect the seal from the heat of the anode 6. Current is supplied to the stem 7 by any suitable means, such, for example, as a stranded conductor 9. The seal is shown at the point 10 and is formed by a cylindrical air of sodium boro-silicate glass fused to the stem 7 and, in turn, joined to a reëntrant portion 11 of the container 3.

In the manufacture of my seal, the stem 7 is carefully cleansed and dipped in a flux of potassium nitrite or potassium nitrate and borax, and the boro-silicate glass is then applied thereto in a fused condition. A reaction takes place between the flux, the superficial oxid of the metal and alkali from the glass, with the formation of an intermediate layer of graded composition which has the property of closely adhering both to the metal and to the glass. Quite accurate control of the composition of this layer may be obtained by varying the amount of flux employed, the color of the resultant layer varying from a light bronze to a deep black. Furthermore, the composition of this layer may be controlled by regulating the time of heating after the seal is formed, since the reaction continues as long as the glass is in the molten state. At the start of the sealing operation, the flux has a relatively low melting point but as the reaction proceeds, the melting point of the intermediate layer rises until it equals or even exceeds the melting point of the glass itself. I consider this a very important feature of my invention as it insures that all portions of the finished seal will be able to withstand a high operating temperature.

In the construction of the seal, I apply the glass to the tungsten or molybdenum rod which has been coated with flux and first apply heat at one end. The above described bronze colored layer of material is formed adjacent to heat source and the flame is then moved along the seal at a rate determined by the rate of progress of the colored zone of the desired intensity. I have shown in Fig. 2 an enlarged view of the seal 10 wherein this intermediate layer is shown at 12.

After the coating of boro-silicate glass has been applied to the stem 7, the entire anode structure 6, with its stem 7, is mounted within the container 3, and a fused glass joint of the usual type is formed between the seal 10 and the glass member 11. The glass member 11 is so shaped as to have considerable transverse elasticity and, hence, it is able to compensate for slight differences in expansion between it and the glass in the seal 10.

In the subjoined claims I have specified the use of tungsten as the preferred embodiment of my invention but I desire to have it distinctly understood that I may employ molybdenum in place thereof with very favorable results. I further desire that only such restrictions shall be placed upon my invention as are set forth in the appended claims or are imposed by the prior art.

I claim as my invention:

1. A seal between glass and metal provided with a layer of material at the junction point composed, in part, of the glass and, in part, of the metal and having a coefficient of expansion intermediate that of the glass and that of the metal.

2. A seal between glass and metal provided with a layer of material at the junction point composed of a flux, compounds of the metal, and constituents of the glass, forming a compound which unites intimately with both the glass and the metal and which has a coefficient of expansion intermediate that of the glass and that of the metal.

3. A seal between glass and metal provided with a layer of material at the junction point composed of a flux, an oxid of the metal and an alkali from the glass, forming a compound which unites intimately with both the glass and the metal and which has a coefficient of expansion intermediate that of the glass and that of the metal.

4. A seal between tungsten and glass provided with a layer of tungsten glass at the junction point, of which the coefficient of expansion is intermediate that of tungsten and that of the glass, said layer being formed from a flux, tungsten oxid derived from the surface of the tungsten and an alkali derived from the glass.

5. The method of welding together two substances having different coefficients of expansion which comprises applying a fluxing material to one of said substances, said fluxing material having the property of combining with material from each of said substances to form a compound having a coefficient of expansion intermediate the coefficients of said substances, placing the two substances in contact, and heating the zone of contact, whereby a layer of said compound is formed and caused to unite intimately with each of said substances to form a vacuum-tight joint therebetween of great mechanical strength.

6. The method of forming a gas-tight joint between tungsten and glass which comprises providing a layer of fluxing material on the surface of the tungsten and applying the glass thereto in a softened state, whereby the fluxing material combines with the superficial oxid of the tungsten and with an alkali from the glass to form a tungsten glass having a coefficient of expansion intermediate that of tungsten and that of the glass employed.

7. The method of welding two dissimilar substances of relatively high melting point together which comprises applying a fluxing material of relatively low melting point to one of said substances, said fluxing material having the property, when heated, of gradually uniting with material from each of said substances to form a compound, the melting point of said compound gradually rising in accordance with the amount of said substances incorporated therewith, placing the two substances in contact and heating the zone of contact for a considerable period of time, whereby a layer of said compound of relatively high melting point is formed and caused to unite intimately with each of said substances, forming a vacuum-tight joint therebetween of great mechanical strength.

8. The method of welding a glass to another substance which comprises applying a flux between said glass and said substance having the property, when heated, of uniting with the glass and the other substance to form an intermediate layer of which the color is an index of the extent of said reaction, applying a heat source to a portion of the weld and moving said heat source to the other portions of the weld at a rate determined by the rate of progress of the zone of intermediate substance of the desired color.

In testimony whereof, I have hereunto subscribed my name this 31st day of Dec. 1914.

HAROLD A. NEWCOMB.

Witnesses:
R. E. TALLEY,
B. B. HINES.